US012811445B2

(12) United States Patent
Takeda et al.

(10) Patent No.: US 12,811,445 B2
(45) Date of Patent: Nov. 24, 2026

(54) ADHESIVELY-LAMINATED CORE FOR STATOR AND ELECTRIC MOTOR

(71) Applicant: NIPPON STEEL CORPORATION, Tokyo (JP)

(72) Inventors: Kazutoshi Takeda, Tokyo (JP); Ryu Hirayama, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 778 days.

(21) Appl. No.: 17/293,102

(22) PCT Filed: Dec. 17, 2019

(86) PCT No.: PCT/JP2019/049273

§ 371 (c)(1),
(2) Date: May 12, 2021

(87) PCT Pub. No.: WO2020/129929

PCT Pub. Date: Jun. 25, 2020

(65) Prior Publication Data

US 2022/0006336 A1 Jan. 6, 2022

(30) Foreign Application Priority Data

Dec. 17, 2018 (JP) ................................ 2018-235863

(51) Int. Cl.
*H02K 1/18* (2006.01)
*B32B 37/12* (2006.01)
(Continued)

(52) U.S. Cl.
CPC .................................. *H02K 1/185* (2013.01)

(58) Field of Classification Search
CPC ....... H01F 3/02; H01F 41/0233; H02K 1/185; H02K 15/021
See application file for complete search history.

(56) References Cited

U.S. PATENT DOCUMENTS 3,386,058 A 5/1968 Michel
4,025,379 A 5/1977 Whetstone
(Continued)

FOREIGN PATENT DOCUMENTS

CN 102792556 A 11/2012
DE 102005038778 A1 3/2007
(Continued)

OTHER PUBLICATIONS

English Language Translation of JP-2004111509-A (Year: 2004).*
(Continued)

*Primary Examiner* — Maria V Ewald
*Assistant Examiner* — Daniel P Dillon
(74) *Attorney, Agent, or Firm* — Renner, Otto, Boisselle & Sklar LLP

(57) ABSTRACT

The present adhesively-laminated core for a stator includes: a plurality of electrical steel sheets coaxially overlapping each other, and each of which having a core back part and a tooth part; and a plurality of adhesion parts which adheres between the electrical steel sheets, in which, between the respective electrical steel sheets, a partial adhesion strength provided by the adhesion parts and being an average adhesion strength per unit area in the tooth part, is lower than a partial adhesion strength provided by the adhesion parts and being an average adhesion strength per unit area in the core back part.

9 Claims, 6 Drawing Sheets

(51) Int. Cl.
*H01F 3/02* (2006.01)
*H02K 15/021* (2025.01)

(56) References Cited

U.S. PATENT DOCUMENTS 4,103,195 A 7/1978 Torossian
4,413,406 A 11/1983 Bennett
5,142,178 A 8/1992 Kloster et al.
5,248,405 A 9/1993 Kaneda et al.
5,338,996 A 8/1994 Yamamoto
5,448,119 A 9/1995 Kono et al.
5,994,464 A 11/1999 Ohsawa et al.
6,495,936 B2 12/2002 Kikuchi et al.
6,653,758 B2 11/2003 Tsuneyoshi et al.
7,298,064 B2 11/2007 Yamamoto
7,562,439 B2 7/2009 Yamamoto
7,859,163 B2 12/2010 Bertocchi et al.
7,952,254 B2 5/2011 Cho et al.
8,015,691 B2 9/2011 Miyake
8,580,217 B2 11/2013 Hipszki et al.
8,581,468 B2 11/2013 Kudose et al.
8,697,811 B2 4/2014 Kishi et al.
8,943,677 B2 2/2015 Gerster et al.
9,331,530 B2 5/2016 Jang et al.
9,512,335 B2 12/2016 Hoshi et al.
9,770,949 B2 9/2017 Fudemoto et al.
9,833,972 B2 12/2017 Ohishi et al.
10,340,754 B2 7/2019 Ogino et al.
10,348,170 B2 7/2019 Izumi et al.
10,476,321 B2 11/2019 Li et al.
10,491,059 B2 11/2019 Murakami et al.
10,547,225 B2 1/2020 Hattori et al.
10,574,112 B2 2/2020 Tomonaga
10,819,201 B2 10/2020 Thumm et al.
10,840,749 B2 11/2020 Chaillou et al.
11,056,934 B2 7/2021 Kubota et al.
11,616,407 B2 3/2023 Hino et al.
2002/0047459 A1 4/2002 Adaeda et al.
2002/0163277 A1 11/2002 Miyake et al.
2004/0056556 A1 3/2004 Fujita
2004/0124733 A1 7/2004 Yamamoto et al.
2006/0043820 A1 3/2006 Nakahara
2007/0024148 A1 2/2007 Maita et al.
2007/0040467 A1 2/2007 Gu
2007/0182268 A1 8/2007 Hashiba et al.
2009/0026873 A1 1/2009 Matsuo et al.
2009/0195110 A1 8/2009 Miyaki
2009/0230812 A1 9/2009 Cho et al.
2010/0090560 A1 4/2010 Myojin
2010/0197830 A1 8/2010 Hayakawa et al.
2010/0219714 A1 9/2010 Abe et al.
2010/0244617 A1 9/2010 Nobata et al.
2011/0180216 A1 7/2011 Miyake
2011/0269894 A1 11/2011 Miyamoto
2012/0088096 A1 4/2012 Takeda et al.
2012/0128926 A1 5/2012 Ohishi et al.
2012/0156441 A1 6/2012 Gerster
2012/0235535 A1 9/2012 Watanabe
2012/0288659 A1 11/2012 Hoshi et al.
2013/0244029 A1 9/2013 Igarashi et al.
2014/0023825 A1 1/2014 Igarashi et al.
2015/0028717 A1 1/2015 Luo et al.
2015/0097463 A1 4/2015 Blocher et al.
2015/0130318 A1 5/2015 Kitada et al.
2015/0256037 A1 9/2015 Kudose
2015/0337106 A1 11/2015 Kajihara
2016/0023447 A1 1/2016 Shimizu
2016/0352159 A1 12/2016 Li et al.
2016/0352165 A1 12/2016 Fubuki
2017/0117758 A1 4/2017 Nakagawa
2017/0287625 A1 10/2017 Ito
2017/0342519 A1 11/2017 Uesaka et al.
2017/0368590 A1 12/2017 Senda et al.
2018/0030292 A1 2/2018 Gotou
2018/0056629 A1* 3/2018 Hamamura .......... H02K 15/024
2018/0134926 A1 5/2018 Lei et al.
2018/0159389 A1 6/2018 Nishikawa
2018/0212482 A1 7/2018 Nigo
2018/0248420 A1 8/2018 Enokizono et al.
2018/0295678 A1 10/2018 Okazaki et al.
2018/0309330 A1 10/2018 Ueda
2018/0342925 A1 11/2018 Horii et al.
2019/0010361 A1 1/2019 Hoshi
2019/0028006 A1* 1/2019 Hamamura ......... H01F 41/0233
2019/0040183 A1 2/2019 Yoshida et al.
2020/0048499 A1 2/2020 Andou et al.
2020/0099263 A1 3/2020 Hirosawa et al.
2020/0186014 A1 6/2020 Kusuyama
2021/0296975 A1 9/2021 Hino et al.

FOREIGN PATENT DOCUMENTS

EP 3553799 A1 10/2019
EP 3562006 A1 10/2019
FR 2803126 A1 6/2001
JP 56-065326 A 6/1981
JP 57-006427 A 1/1982
JP 60-170681 A 9/1985
JP 60-186834 A 12/1985
JP 60-186834 U 12/1985
JP 62-009951 A 1/1987
JP 63-207639 A 8/1988
JP 01168777 A * 7/1989
JP 03-124247 A 5/1991
JP 03-247683 A 11/1991
JP 04-028743 A 3/1992
JP 04-028743 U 3/1992
JP 07-118620 A 5/1995
JP 07-298567 A 11/1995
JP 08-259899 A 10/1996
JP 10-304610 A 11/1998
JP 11-162724 A 6/1999
JP 2000-050539 A 2/2000
JP 2000-152570 A 5/2000
JP 2001-115125 A 4/2001
JP 2002-078257 A 3/2002
JP 2002-088107 A 3/2002
JP 2002-105283 A 4/2002
JP 2002-125341 A 4/2002
JP 2002-151335 A 5/2002
JP 2002-151339 A 5/2002
JP 2002-164224 A 6/2002
JP 2002-332320 A 11/2002
JP 2003-199303 A 7/2003
JP 2003-206464 A 7/2003
JP 2003-219585 A 7/2003
JP 2003-264962 A 9/2003
JP 2003284274 A 10/2003
JP 2004-088970 A 3/2004
JP 2004111509 A * 4/2004
JP 2004-150859 A 5/2004
JP 2005-019642 A 1/2005
JP 2005-268589 A 9/2005
JP 2005-269732 A 9/2005
JP 2006-254530 A 9/2006
JP 2006-288114 A 10/2006
JP 2006-334648 A 12/2006
JP 2006-353001 A 12/2006
JP 2007015302 A 1/2007
JP 2007-039721 A 2/2007
JP 2008-067459 A 3/2008
JP 4143090 B 9/2008
JP 2009072035 A 4/2009
JP 2009-177895 A 8/2009
JP 2010-004716 A 1/2010
JP 2010081659 A 4/2010
JP 2010-220324 A 9/2010
JP 2010-259158 A 11/2010
JP 2011-023523 A 2/2011
JP 2011-195735 A 10/2011
JP 2012029494 A 2/2012
JP 2012-061820 A 3/2012
JP 2012060773 A 3/2012
JP 2012-120299 A 6/2012

(56) References Cited

FOREIGN PATENT DOCUMENTS

| | | | |
|---|---|---|---|
| JP | 2012196100 | A | 10/2012 |
| JP | 2013-089883 | A | 5/2013 |
| JP | 2013-181101 | A | 9/2013 |
| JP | 2013-253153 | A | 12/2013 |
| JP | 5423465 | B2 | 2/2014 |
| JP | 2014-096429 | A | 5/2014 |
| JP | 2014-155347 | A | 8/2014 |
| JP | 2015-012756 | A | 1/2015 |
| JP | 2015-082848 | A | 4/2015 |
| JP | 2015-136228 | A | 7/2015 |
| JP | 2015-142453 | A | 8/2015 |
| JP | 2015-164389 | A | 9/2015 |
| JP | 2015-171202 | A | 9/2015 |
| JP | 2016-025317 | A | 2/2016 |
| JP | 2016-046969 | A | 4/2016 |
| JP | 2016-073109 | A | 5/2016 |
| JP | 2016-140134 | A | 8/2016 |
| JP | 2016-171652 | A | 9/2016 |
| JP | 2016167907 | A | 9/2016 |
| JP | 2017-005906 | A | 1/2017 |
| JP | 2017-011863 | A | 1/2017 |
| JP | 2017-028911 | A | 2/2017 |
| JP | 2017-046442 | A | 3/2017 |
| JP | 2017-075279 | A | 4/2017 |
| JP | 2017-218596 | A | 12/2017 |
| JP | 2018-038119 | A | 3/2018 |
| JP | 2018-061319 | A | 4/2018 |
| JP | 2018-078691 | A | 5/2018 |
| JP | 2018-083930 | A | 5/2018 |
| JP | 2018-093704 | A | 6/2018 |
| JP | 2018-107852 | A | 7/2018 |
| JP | 2018/138634 | A | 9/2018 |
| JP | 2018-145492 | A | 9/2018 |
| KR | 10-2017-0087915 | A | 7/2017 |
| KR | 10-2018-0110157 | A | 10/2018 |
| TW | 201809023 | A | 3/2018 |
| WO | 2010/082482 | A1 | 7/2010 |
| WO | 2011/013691 | A1 | 2/2011 |
| WO | 2011/054065 | A2 | 5/2011 |
| WO | 2014/102915 | A1 | 7/2014 |
| WO | 2016017132 | A1 | 2/2016 |
| WO | 2017/033229 | A1 | 3/2017 |
| WO | 2017104479 | A1 | 6/2017 |
| WO | 2017/170957 | A | 10/2017 |
| WO | 2017/199527 | A1 | 11/2017 |
| WO | 2018/043429 | A1 | 3/2018 |
| WO | 2018/093130 | A1 | 5/2018 |
| WO | 2018/105473 | A1 | 6/2018 |
| WO | 2018/138864 | A1 | 8/2018 |
| WO | 2018/207277 | A1 | 11/2018 |
| WO | 2018/216565 | A1 | 11/2018 |
| WO | 2020/129921 | A1 | 6/2020 |
| WO | 2020/129923 | A1 | 6/2020 |
| WO | 2020/129924 | A1 | 6/2020 |
| WO | 2020/129925 | A1 | 6/2020 |
| WO | 2020/129926 | A1 | 6/2020 |
| WO | 2020/129927 | A1 | 6/2020 |
| WO | 2020/129928 | A1 | 6/2020 |
| WO | 2020/129935 | A1 | 6/2020 |
| WO | 2020/129936 | A1 | 6/2020 |
| WO | 2020/129937 | A1 | 6/2020 |
| WO | 2020/129938 | A1 | 6/2020 |
| WO | 2020/129940 | A1 | 6/2020 |
| WO | 2020/129941 | A1 | 6/2020 |
| WO | 2020/129942 | A1 | 6/2020 |
| WO | 2020/129946 | A1 | 6/2020 |
| WO | 2020/129948 | A1 | 6/2020 |
| WO | 2020/129951 | A1 | 6/2020 |

OTHER PUBLICATIONS

English Language Translation of JP-01168777-A (Year: 1989).*

Matweb, "Plaskolite West Optix® CA-41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

Japanese Industrial Standard (JIS) C 2552: 2014, relevance discussed in specification.

Japanese Industrial Standard (JIS) C 2553: 2012, relevance discussed in specification.

Japanese Industrial Standard (JIS) R 1602: 1995, relevance discussed in specification.

Japanese Industrial Standard (JIS) Z 2241: 2011.

Japanese Industrial Standard (JIS) K 7252-1:2016.

Japanese Industrial Standard (JIS) K 7121-1987.

Japanese Industrial Standard (JIS) K 6850: 1999.

The papers of technical meetings in the Institute of Electrical Engineers of Japan,RM-92-79, 1992.

* cited by examiner

ADHESIVELY-LAMINATED CORE FOR STATOR AND ELECTRIC MOTOR

TECHNICAL FIELD

The present invention relates to an adhesively-laminated core for a stator and an electric motor.

Priority is claimed on Japanese Patent Application No. 2018-235863, filed Dec. 17, 2018, the content of which is incorporated herein by reference.

BACKGROUND ART

In a laminated core used for a motor, when a thickness of an electrical steel sheet is reduced, rigidity per one electrical steel sheet decreases. Therefore, although the number of laminations thereof increases, the rigidity of the entire laminated core also decreases. In this case, when the motor is operated, deformation of a stator or displacement of the laminated core may occur due to rotation of a rotor. Further, when the number of laminations increases, handling at the time of manufacturing the laminated core becomes difficult, and problems such as deformation of the laminated core and difficulty in winding processing occur.

To solve such problems, for example, as in a motor core (a laminated core) described in Patent Document 1 below, increasing the mechanical strength of the laminated core may be performed by fixing a shape of the laminated core with an adhesive. That is, in the motor core described in Patent Document 1, room temperature curing type instant adhesive layers are disposed in all of tooth parts so as to extend in directions (radial directions) in which the tooth parts extend. Further, a plurality of thermosetting type organic-based adhesive layers are disposed in a circumferential direction of substantially annular electrical steel sheets. In addition, adjacent electrical steel sheets are adhered to each other by the room temperature curing type instant adhesive layers and the thermosetting type organic-based adhesive layers.

CITATION LIST

Patent Document

[Patent Document 1]

Japanese Unexamined Patent Application, First Publication No. 2016-171652

SUMMARY OF THE INVENTION

Problems to be Solved by the Invention

However, if the strength of adhesives in tooth parts is too high, a compressive force due to shrinkage when the adhesives cure is applied to the tooth parts, which adversely affects their magnetic properties. In the technique disclosed in Patent Document 1, this problem is not recognized, and, of course, no measures are taken to solve this problem.

The present invention has been made in view of the above circumstances, and an object thereof is to provide an adhesively-laminated core for a stator including an adhesion structure that does not adversely affect the magnetic properties of tooth parts while increasing the mechanical strength thereof, and an electric motor including the adhesively-laminated core for a stator.

Means for Solving the Problem

In order to solve the above problem, the present invention employs the following measures.

(1) An adhesively-laminated core for a stator according to one aspect of the present invention includes: a plurality of electrical steel sheets coaxially overlapping each other, and each of which having a core back part and a tooth part; and a plurality of adhesion parts which adheres between the electrical steel sheets, in which, between the respective electrical steel sheets, a partial adhesion strength provided by the adhesion parts and being an average adhesion strength per unit area in the tooth part, is lower than a partial adhesion strength provided by the adhesion parts and being an average adhesion strength per unit area in the core back part.

(2) In the aspect according to the above (1), the following configuration may be adopted: an average value of an adhesion strength ratio obtained by dividing the partial adhesion strength in the tooth part by the partial adhesion strength in the core back part is in the range of 0.1 or more and less than 1.0.

(3) In the aspect according to the above (1) or (2), the following configuration may be adopted: an average value S1 of the partial adhesion strength in the tooth part is 1 to 15 MPa; an average value S2 of the partial adhesion strength in the core back part is 15 to 50 MPa; and the average value S1 is lower than the average value S2.

(4) In the aspect according to the above (1) or (2), the following configuration may be adopted: each of the adhesion parts is made of an adhesive having the same chemical composition; an average value A1 of an area ratio of the adhesion parts in the tooth part is 10 to 50%; an average value A2 of the area ratio of the adhesion parts in the core back part is 50 to 100%; and the average value A1 is lower than the average value A2.

(5) In the aspect according to any one of the above (1) to (4), an average thickness of the adhesion parts may be 1.0 μm to 3.0 μm.

(6) In the aspect according to any one of the above (1) to (5), an average tensile modulus of elasticity E of the adhesion parts may be 1500 MPa to 4500 MPa.

(7) In the aspect according to any one of the above (1) to (6), the adhesion parts may be a room temperature adhesion type acrylic-based adhesive containing an SGA made of an elastomer-containing acrylic-based adhesive.

(8) An electric motor according to one aspect of the present invention includes the adhesively-laminated core for a stator according to any one of the above (1) to (7).

Effects of the Invention

According to each aspect of the present invention, it is possible to provide an adhesively-laminated core for a stator including an adhesion structure that does not adversely affect magnetic properties of tooth parts while increasing mechanical strength thereof, and an electric motor including the adhesively-laminated core for a stator.

EMBODIMENTS FOR IMPLEMENTING THE INVENTION

Hereinafter, with reference to the drawings, an adhesively-laminated core for a stator and an electric motor including the adhesively-laminated core for a stator according to one embodiment of the present invention will be described. Also, in the present embodiment, as the electric motor, a motor, specifically, an AC motor, more specifically, a synchronous motor, and more specifically, a permanent magnetic electric motor will be described as an example. This type of motor is suitably adopted for, for example, an electric vehicle.

Figure 1:
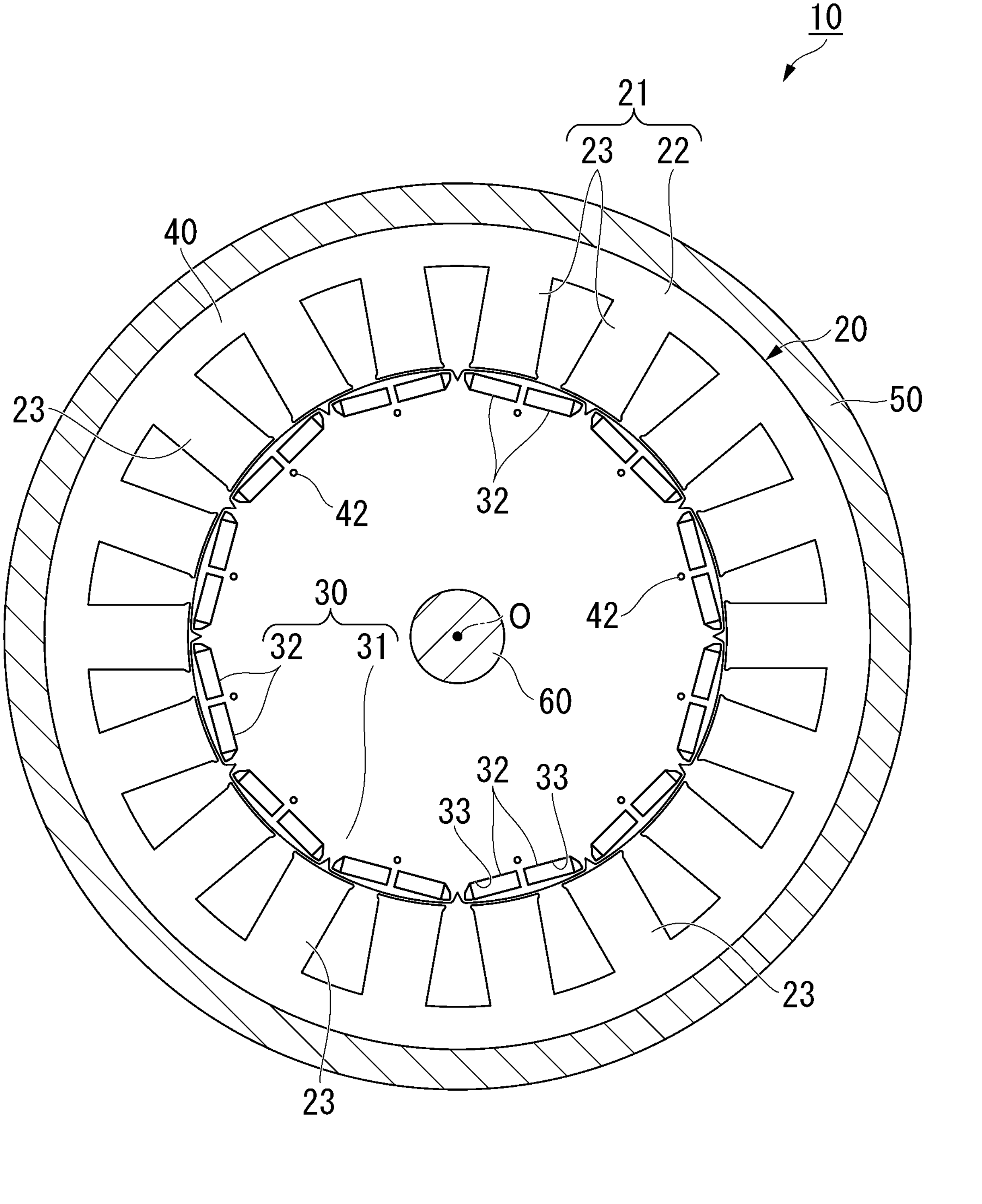
FIG. 1 is a cross-sectional view of an electric motor including an adhesively-laminated core for a stator according to an embodiment of the present invention.

As shown in FIG. 1, an electric motor 10 includes a stator 20, a rotor 30, a case 50, and a rotation shaft 60. The stator 20 and the rotor 30 are accommodated in the case 50. The stator 20 is fixed to an inside of the case 50.

In the present embodiment, as the electric motor 10, an inner rotor type electric motor in which the rotor 30 is located radially inside the stator 20 is adopted. However, as the electric motor 10, an outer rotor type electric motor in which the rotor 30 is located outside the stator 20 may be adopted. Further, in the present embodiment, the electric motor 10 is a three-phase AC motor having 12 poles and 18 slots. However, the number of poles, the number of slots, the number of phases, and the like can be changed as appropriate.

The electric motor 10 can rotate at a rotation speed of 1000 rpm by applying, for example, an excitation current having an effective value of 10 A and a frequency of 100 Hz to each phase.

The stator 20 includes an adhesively-laminated core for a stator (hereinafter, a stator core) 21 and windings (not shown).

The stator core 21 includes an annular core back part 22 and a plurality of tooth parts 23. Hereinafter, a direction along a central axis O of the stator core 21 (or the core back part 22) is referred to as the axial direction, a radial direction of the stator core 21 (or the core back part 22) (i.e., a direction orthogonal to the central axis O) is referred to as the radial direction, and a circumferential direction of the stator core 21 (or the core back part 22) (i.e., a direction revolving around the central axis O) is referred to as the circumferential direction.

The core back part 22 is formed in an annular shape in a plan view of the stator 20 along the axial direction.

The plurality of tooth parts 23 extend inward in the radial direction (toward the central axis O of the core back part 22 in the radial direction) from an inner circumference of the core back part 22. The plurality of tooth parts 23 are disposed at equal angular intervals in the circumferential direction. In the present embodiment, 18 tooth parts 23 are provided at every 20 degrees with respect to a central angle centered on the central axis O. The plurality of tooth parts 23 are formed to have the same shape and the same size with each other. Therefore, the plurality of tooth parts 23 have the same thickness dimension with each other.

The windings are wound around the tooth parts 23. The windings may be concentrated windings or distributed windings.

The rotor 30 is disposed inside the stator 20 (stator core 21) in the radial direction. The rotor 30 includes a rotor core 31 and a plurality of permanent magnets 32.

The rotor core 31 is formed in an annular shape (an annular ring shape) disposed coaxially with the stator 20. The rotation shaft 60 is disposed inside the rotor core 31. The rotation shaft 60 is fixed to the rotor core 31.

The plurality of permanent magnets 32 are fixed to the rotor core 31. In the present embodiment, a set of two permanent magnets 32 form one magnetic pole. A plurality of sets of permanent magnets 32 are arranged at equal intervals in the circumferential direction. In the present embodiment, 12 sets of permanent magnets 32 (24 in total) are provided at every 30 degrees of the central angle centered on the central axis O.

In the present embodiment, an interior permanent magnet motor is adopted as a permanent magnetic electric motor. A plurality of through-holes 33 that penetrate the rotor core 31 in the axial direction are formed in the rotor core 31. The plurality of through-holes 33 are provided to correspond to an arrangement of the plurality of permanent magnets 32. Each permanent magnet 32 is fixed to the rotor core 31 in a state in which it is disposed in the corresponding through-hole 33. Fixing of each permanent magnet 32 to the rotor core 31 can be realized, for example, by providing adhesion between an outer surface of the permanent magnet 32 and an inner surface of the through-hole 33 with an adhesive, or the like. Also, as the permanent magnetic electric motor, a surface permanent magnet motor may be adopted instead of an interior permanent magnet motor.

Figure 2:
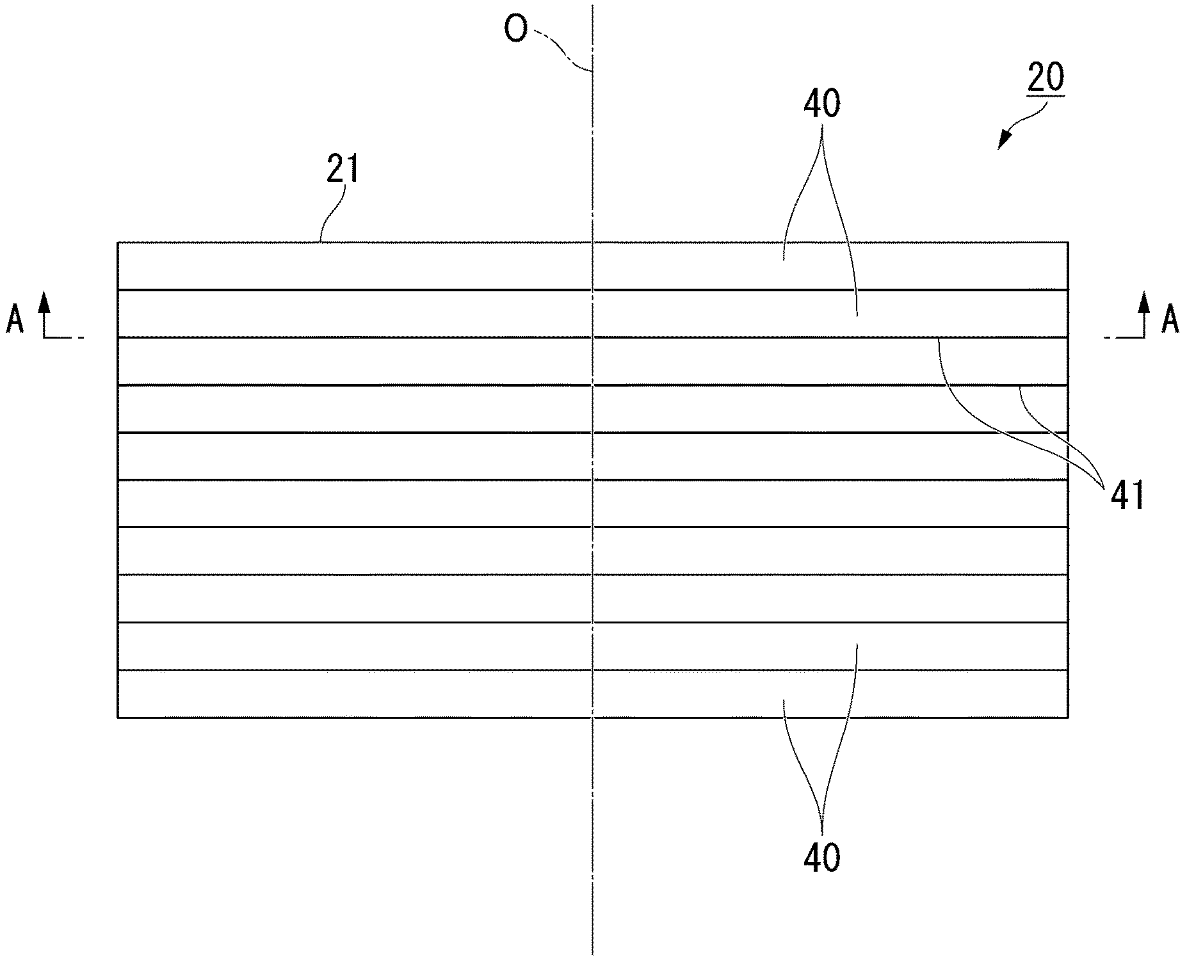
FIG. 2 is a side view of the adhesively-laminated core for a stator.

The stator core 21 and the rotor core 31 are both laminated cores. For example, as shown in FIG. 2, the stator core 21 is formed by laminating a plurality of electrical steel sheets 40 in the axial direction.

Further, a laminated thickness (the entire length along the central axis O) of each of the stator core 21 and the rotor core 31 is, for example, 50.0 mm. An outer diameter of the stator core 21 is, for example, 250.0 mm. An inner diameter of the stator core 21 is, for example, 165.0 mm. An outer diameter of the rotor core 31 is, for example, 163.0 mm. An inner diameter of the rotor core 31 is, for example, 30.0 mm. However, these values are examples, and the laminated thickness, the outer diameter, and the inner diameter of the stator core 21, and the laminated thickness, the outer diameter, and the inner diameter of the rotor core 31 are not limited to only these values. Here, the inner diameter of the stator core 21 is measured with tips of the tooth parts 23 of the stator core 21 as a reference. That is, the inner diameter of the stator core 21 is a diameter of a virtual circle inscribed in the tips of all the tooth parts 23.

Each electrical steel sheet 40 forming the stator core 21 and the rotor core 31 is formed, for example, by punching an electrical steel sheet serving as a base material. As the electrical steel sheet 40, a known electrical steel sheet can be used. A chemical composition of the electrical steel sheet 40 includes 2.5% to 3.9% of Si, as shown below in units of mass %. Ranges of components other than Si are not particularly limited, but the desirable ranges in the present embodiment are specified below. By setting the chemical composition in these ranges, a yield strength YP of each electrical steel sheet 40 can be set to 380 MPa or more and 540 MPa or less.

Si: 2.5% to 3.9%

Al: 0.001% to 3.0%

Mn: 0.05% to 5.0%

Remainder: Fe and impurities

In the present embodiment, a non-grain-oriented electrical steel sheet is used as the electrical steel sheet 40. As the non-grain-oriented electrical steel sheet, for example, a non-grain-oriented electrical steel strip of JIS C 2552:2014 can be adopted. However, as the electrical steel sheet 40, it is also possible to use a grain-oriented electrical steel sheet instead of a non-grain-oriented electrical steel sheet. As the grain-oriented electrical steel sheet in this case, a grain-oriented electrical steel strip of JIS C 2553:2012 can be adopted.

Insulation coatings are provided on both surfaces of the electrical steel sheet 40 in order to improve workability of the electrical steel sheet 40 and an iron loss of the stator core 21 (hereinafter, may be simply referred to as a "laminated core"). As a substance constituting the insulation coating, for example, (1) an inorganic compound, (2) an organic resin, (3) a mixture of an inorganic compound and an organic resin, and the like can be adopted. Among these, in a case in which the insulation coating is (1) an inorganic compound, or (3) a mixture of an inorganic compound and an organic resin, it is possible to significantly inhibit deterioration in magnetic properties due to cure shrinkage of each of the adhesion parts. As the inorganic compound, for example, (1) a complex of dichromate and boric acid, (2) a complex of phosphate and silica, and the like can be exemplified. As the organic resin, an epoxy-based resin, an acrylic-based resin, an acrylic-styrene-based resin, a polyester-based resin, a silicone-based resin, and a fluorine-based resin can be exemplified.

In order to ensure insulation performance between the electrical steel sheets 40 laminated on each other, an upper limit of an average thickness of the insulation coating (an average thickness per one surface of the electrical steel sheet 40) is preferably 1.5 μm, more preferably to 1.2 μm.

On the other hand, the insulation effect becomes saturated when the insulation coating becomes thicker. Further, as the insulation coating becomes thicker, a space factor of the electrical steel sheet 40 in the laminated core decreases, and performance of the laminated core deteriorate. Therefore, the insulation coating may be as thin as possible within a range in which the insulation performance can be ensured. The lower limit of the average thickness of the insulation coating (thickness per one surface of the electrical steel sheet 40) is preferably set to 0.3 μm, more preferably to 0.5 μm. As the average thickness of the insulation coating, for example, 0.8 μm can be adopted within the above upper and lower limit ranges.

The average thickness of the insulation coating is an average value of the entire laminated core. A thickness of the insulation coating hardly changes over laminated positions thereof in the axial direction and a circumferential position around the central axis of the laminated core. For that reason, the average thickness of the insulation coating can be set as a value measured at an upper end position of the laminated core.

As the thickness of the electrical steel sheet 40 becomes thinner, the effect of improving the iron loss gradually becomes saturated. Further, as the electrical steel sheet 40 becomes thinner, manufacturing costs of the electrical steel sheet 40 increase. For that reason, the thickness of the electrical steel sheet 40 is preferably 0.10 mm or more in consideration of the effect of improving the iron loss and the manufacturing costs.

On the other hand, if the electrical steel sheet 40 is too thick, press punching work of the electrical steel sheet 40 becomes difficult. For that reason, considering the press punching work of the electrical steel sheet 40, the thickness of the electrical steel sheet 40 is preferably 0.65 mm or less. Also, the thickness of the electrical steel sheet 40 includes the thickness of the insulation coating.

The average thickness of each electrical steel sheet 40 is an average value of the entire laminated core. The thickness of each electrical steel sheet 40 hardly changes over the laminated positions in the axial direction and the circumferential position around the central axis of the laminated core. For that reason, the average thickness of each electrical steel sheet 40 can be set as a value measured at the upper end position of the laminated core.

The plurality of electrical steel sheets 40 forming the stator core 21 are laminated, for example, via a plurality of point-shaped adhesion parts 41. Each of the adhesion parts 41 is formed of an adhesive that has been cured without being divided. For the adhesion part 41, for example, a thermosetting type adhesive by polymer bonding or the like is used. As the adhesive for forming the adhesion part 41, it is possible to adapt an adhesive which contains any one of (1) an acrylic-based resin, (2) an epoxy-based resin, and (3) an acrylic-based resin with an epoxy-based resin, each having oil accommodating adhesiveness.

For the adhesive for forming the adhesion part 41, a radical polymerization type adhesive or the like can be used in addition to a thermosetting type adhesive, and from the viewpoint of productivity, a room temperature curing type adhesive is preferably used. The room temperature curing type (room temperature adhesion type) adhesive cures at 20° C. to 30° C. As the room temperature curing type adhesive, an acrylic-based adhesive is preferable. A typical acrylic-based adhesive includes a second generation acrylic adhesive (SGA) and the like. Any of an anaerobic adhesive, an instant adhesive, and an elastomer-containing acrylic-based adhesive can be used within the range in which the effects of the present invention are not impaired. Also, the adhesive mentioned herein is an adhesive in a state before curing and becomes the adhesion part 41 after the adhesive is cured.

An average tensile modulus of elasticity of the adhesion part 41 at room temperature (20° C. to 30° C.) is in the range of 1500 MPa to 4500 MPa. If the average tensile modulus of elasticity of the adhesion part 41 is less than 1500 MPa, there will be a problem that rigidity of the laminated core is lowered. For that reason, a lower limit of the average tensile modulus of elasticity of the adhesion part 41 is 1500 MPa, more preferably 1800 MPa. On the contrary, if the average tensile modulus of elasticity of the adhesion part 41 exceeds 4500 MPa, there will be a problem that stress and strain applied to the electrical steel sheet 40 increase and core magnetism deteriorates. For that reason, an upper limit of the average tensile modulus of elasticity of the adhesion part 41 is 4500 MPa, more preferably 3650 MPa. The average tensile modulus of elasticity of each adhesion part 41 can be adjusted by changing one or both of: heating and pressurizing conditions applied at the time of adhesion; and a type of curing agent.

Also, the average tensile modulus of elasticity E is measured using a resonance method. Specifically, the average tensile modulus of elasticity is measured in accordance with JIS R 1602:1995.

More specifically, first, a sample for measurement (not shown) is manufactured. This sample is obtained by providing adhesion between two electrical steel sheets 40 using an adhesive, which is a measurement target, and curing them to form the adhesion part 41. In a case in which the adhesive is a thermosetting type, the curing is performed by heating and pressurizing it under heating and pressurizing conditions in actual work. On the other hand, in a case in which the adhesive is a room temperature curing type, the curing is performed by pressurizing it at room temperature.

In addition, the tensile modulus of elasticity of this sample is measured using the resonance method. As described above, the method for measuring the tensile modulus of elasticity using the resonance method is performed in accordance with JIS R 1602:1995. Then, the tensile modulus of elasticity of the adhesion part 41 alone can be obtained by removing influence of the electrical steel sheet 40 itself from the tensile modulus of elasticity (measured value) of the sample by calculation.

Since the tensile modulus of elasticity obtained from the sample in this way is equal to an average value of the entire laminated core, this value is regarded as the average tensile modulus of elasticity. The composition is set such that the average tensile modulus of elasticity hardly changes over laminated positions in the axial direction or at a circumferential position around the central axis of the laminated core.

For that reason, the average tensile modulus of elasticity can be set to a value obtained by measuring the adhesion part 41 after curing at the upper end position of the laminated core.

As a method of adhering between the electrical steel sheets 40, a method of adhering with which an adhesive is applied to lower surfaces (surfaces on one side) of the electrical steel sheets 40, then they are overlapped, and then one or both of heating and press-stacking are performed to cure the adhesive to form the adhesion part 41 can be adopted. Also, a means in the case of heating may be any means such as a means for heating the stator core 21 in a high temperature bath or an electric furnace, or a method of directly energizing and heating the stator core 21. On the other hand, in a case in which a room temperature curing type adhesive is used, they are adhered only by press-stacking without heating.

In order to obtain stable and sufficient adhesion strength, a thickness of the adhesion part 41 is preferably 1 μm or more.

On the other hand, if the thickness of the adhesion part 41 exceeds 100 μm, an adhesion force is saturated. Further, as the adhesion part 41 becomes thicker, a space factor thereof decreases, and the magnetic properties such as the iron loss of the laminated core decrease. Therefore, the thickness of the adhesion part 41 is preferably 1 μm or more and 100 μm or less, more preferably 1 μm or more and 10 μm or less.

Further, in the above, the thickness of the adhesion part 41 indicates the average thickness of the adhesion part 41.

The average thickness of the adhesion part 41 is more preferably 1.0 μm or more and 3.0 μm or less. If the average thickness of the adhesion part 41 is less than 1.0 μm, sufficient adhesion strength cannot be secured as described above. For that reason, a lower limit of the average thickness of the adhesion part 41 is 1.0 μm, more preferably 1.2 μm. On the contrary, if the average thickness of the adhesion part 41 becomes thicker than 3.0 μm, problems such as a great increase in a strain amount of the electrical steel sheet 40 due to shrinkage during thermal curing occur. For that reason, an upper limit of the average thickness of the adhesion part 41 is 3.0 μm, more preferably 2.6 μm.

The average thickness of the adhesion part 41 is an average value of the entire laminated core. The average thickness of the adhesion part 41 hardly changes over the laminated positions in the axial direction and the circumferential position around the central axis of the laminated core. For that reason, the average thickness of the adhesion part 41 can be set as an average value of numerical values measured at 10 or more points in the circumferential direction at the upper end position of the laminated core.

Also, the average thickness of the adhesion part 41 can be adjusted by changing, for example, an amount of the adhesive applied.

Figure 3:
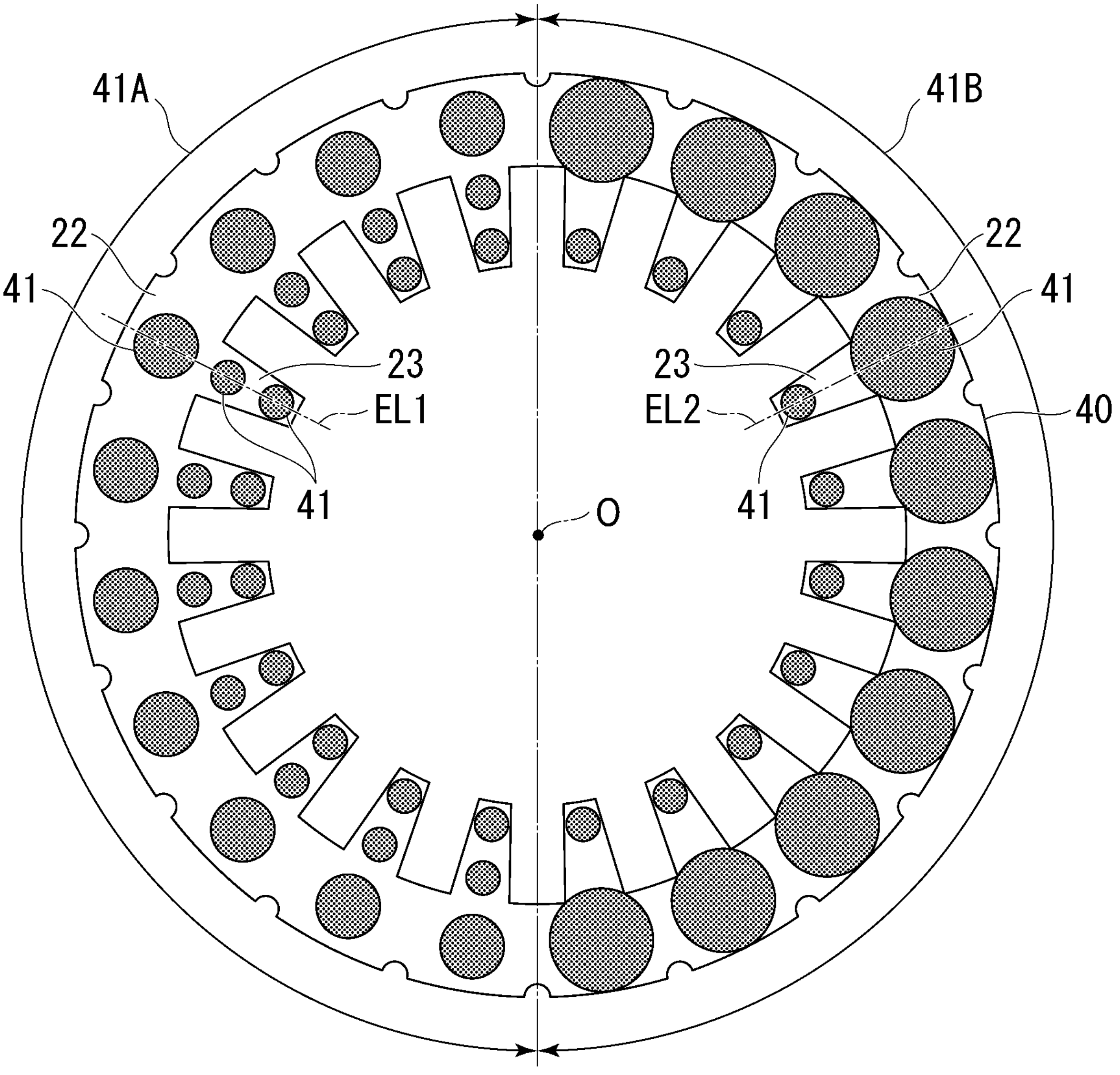
FIG. 3 is a cross-sectional view along line A-A in FIG. 2, showing a plurality of examples of formation patterns of adhesion parts in the adhesively-laminated core for a stator.

FIG. 3 shows an example of formation patterns of the adhesion part 41. In FIG. 3, two formation patterns 41A and 41B are shown together in one figure with an alternate long and short dash line as a boundary. In the case of adopting the formation pattern 41A, the entire surface of the electrical steel sheet 40 is formed in such a coating pattern. On the other hand, in the case of adopting the formation pattern 41B, the entire surface of the electrical steel sheet 40 is formed in such a coating pattern. First, in the case of the formation pattern 41A, the adhesion part 41 is formed such that an average area ratio thereof in core back part 22 and an average area ratio thereof in the tooth parts 23 are equal to each other at each position of the laminated core in the axial direction, but components of the adhesive itself used are different from each other. In the core back part 22, a plurality of circular point-shaped adhesion part 41 are disposed in an annular shape. Each of the adhesion parts 41 on the core back part 22 is disposed to overlap a virtual straight line EL1 connecting a central position of each tooth part 23 in the width direction and the central axis O of the electrical steel sheet 40.

On the other hand, in the tooth part 23, two adhesion parts 41 are disposed side by side to overlap the virtual straight line EL1 for each tooth part 23. A diameter dimension of the adhesion part 41 in the core back part 22 is larger than a diameter dimension of the adhesion part 41 in the tooth part 23. For that reason, the number of the adhesion parts 41 in the core back part 22 is smaller than the number of the adhesion parts 41 in the tooth part 23, but the area ratios are the same. That is, a ratio of a sum of areas of each adhesion part 41 on the core back part 22 to a total area of the core back part 22 and a ratio of a sum of areas of each adhesion part 41 on the tooth part 23 to a total area of the tooth part 23 are the same.

In the case of considering total adhesion strength between the electrical steel sheets 40 that overlap each other as partial strength divided into the core back part 22 and the tooth part 23, if adhesives used are the same, a partial adhesion strength of the core back part 22 and a partial adhesion strength of the tooth part 23 are the same. However, in this formation pattern 41A, adhesion strength of the adhesive used to form the adhesion parts 41 formed on the core back part 22 is higher than adhesion strength of the adhesive used to form the adhesion parts 41 formed on the tooth part 23.

As a result, between the respective electrical steel sheets 40, an average adhesion strength per unit area in the tooth parts 23, due to each of the adhesion parts 41, is lower than an average adhesion strength per unit area in the core back part 22. More specifically, an average value of adhesion strength ratio obtained by dividing the partial adhesion strength per unit area in the tooth parts 23 by the partial adhesion strength per unit area in the core back part 22 is within the range of 0.1 or more and less than 1.0. An upper limit of the average value of the adhesion strength ratio is preferably 0.8, more preferably 0.6. Further, a lower limit of the average value of the adhesion strength ratio is preferably 0.15, more preferably 0.2.

Subsequently, in the case of the formation pattern 41B shown in FIG. 3, the average value of the partial adhesion strength or the average value of the area ratio differs between the core back part 22 and the tooth parts 23 at each position of the laminated core in the axial direction.

Specifically, in the case of comparing by the average value of the partial adhesion strength, an average value S1 of the partial adhesion strength in the tooth parts 23 is 1 to 15 MPa, and an average value S2 of the partial adhesion strength in the core back part 22 is 15 to 50 MPa. In addition, the average value Si is lower than the average value S2.

A lower limit of the average value S1 is preferably 2 MPa, more preferably 3 MPa. An upper limit of the average value S1 is preferably 10 MPa, more preferably 8 MPa. On the other hand, a lower limit of the average value S2 is preferably 20 MPa, more preferably 30 MPa. Also, an upper limit of the average value S2 is preferably 45 MPa, more preferably 40 MPa. However, the point that the average value Si is lower than the average value S2 remains unchanged.

On the other hand, in the case of comparing by the average value of the area ratio, an average value A1 of the area ratio of each adhesion part 41 in the tooth parts 23 is 10 to 50%, and an average value A2 of the area ratio of each adhesion part 41 in the core back part 22 is 50 to 100%. In addition, the average value A1 is lower than the average value A2. Also, the average adhesion strength per unit area of each adhesion part 41 is 5 to 50 MPa, which is common to each position of the tooth parts 23 and the core back part 22.

Further, a lower limit of the average value A1 is preferably 10%. Also, an upper limit of the average value A1 is preferably 30%, more preferably 20%. On the other hand, a lower limit of the average value A2 is preferably 60%, more preferably 70%. Also, an upper limit of the average value A2 is preferably 90%, more preferably 80%. However, the point that the average value A1 is lower than the average value A2 remains unchanged.

In this way, the average value of the partial adhesion strength or the average value of the area ratio is defined as described above between the core back part 22 and the tooth parts 23, whereby the average adhesion strength per unit area of each adhesion part 41 in the tooth parts 23 can be made lower than the average adhesion strength per unit area in the core back part 22.

Regarding an arrangement of each adhesion part 41, in the core back part 22, a plurality of circular point-shaped adhesion parts 41 are disposed in an annular shape. Each of the adhesion parts 41 of the core back part 22 is disposed to overlap a virtual straight line EL2 connecting the central position of each tooth part 23 in the width direction and the central axis O of the electrical steel sheet 40.

On the other hand, in the tooth part 23, one adhesion part 41 is disposed to overlap the virtual straight line EL2 for each tooth part 23. The diameter dimension of the adhesion part 41 in the core back part 22 is larger than the diameter dimension of the adhesion part 41 in the tooth part 23. Thus, the average value of the partial adhesion strength of the tooth part 23 is inhibited to be lower than that of the core back part 22 at each position of the laminated core in the axial direction. In other words, the average value of the area ratio of the tooth part 23 is inhibited to be lower than that of the core back part 22 at each position of the laminated core in the axial direction. As a result, between the electrical steel sheets 40, the average adhesion strength per unit area in the tooth part 23, due to each adhesion part 41, is lower than the average adhesion strength per unit area in the core back part 22.

In the present embodiment, the plurality of electrical steel sheets forming the rotor core 31 are fixed to each other by fastening 42 (dowels) shown in FIG. 1. However, the plurality of electrical steel sheets forming the rotor core 31 may also have a laminated structure fixed by an adhesive like the stator core 21.

Further, the laminated cores of the stator core 21, the rotor core 31 and the like may be formed by so-called turn-stacking.

EXAMPLE

Figure 4:
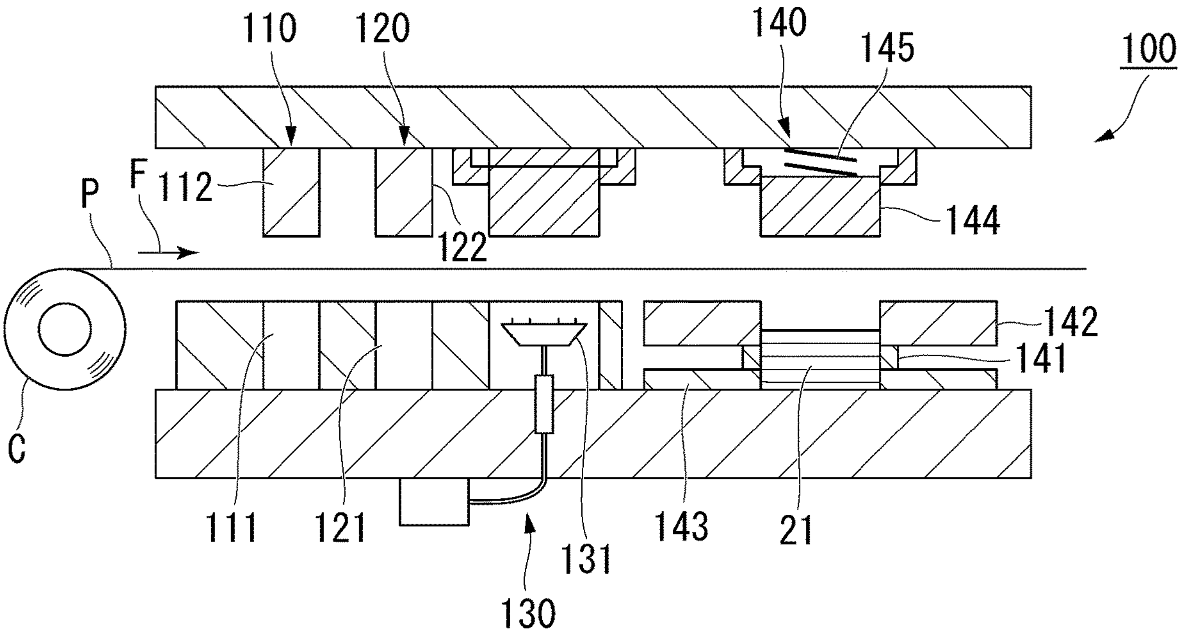
FIG. 4 is a side view of a manufacturing device used for manufacturing examples of the adhesively-laminated core for a stator.

Using a manufacturing device 100 shown in FIG. 4, the stator core 21 was manufactured while changing various manufacturing conditions.

First, the manufacturing device 100 will be described. In the manufacturing device 100, while feeding an electrical steel sheet P from a coil C (a hoop) in a direction of arrow F, punching is performed a plurality of times by molds disposed on each stage to gradually form shapes of the electrical steel sheets 40, an adhesive is applied to lower surfaces of the electrical steel sheets 40, and the punched electrical steel sheets 40 are laminated, pressed and adhered while raising a temperature, thereby forming each adhesion part 41. [0050]

As shown in FIG. 4, the manufacturing device 100 includes a first-stage punching station 110 at a position closest to the coil C, a second-stage punching station 120 adjacently disposed on a downstream side in a conveyance direction of the electrical steel sheet P from the punching station 110, and an adhesive-coating station 130 adjacently disposed on a further downstream side thereof from the punching station 120.

The punching station 110 includes a fixed mold 111 disposed below the electrical steel sheet P and a movable mold 112 disposed above the electrical steel sheet P.

The punching station 120 includes a fixed mold 121 disposed below the electrical steel sheet P and a movable mold 122 disposed above the electrical steel sheet P. Depending on a flat design of a motor, more punching stations may be located.

The adhesive-coating station 130 includes an applicator 131 including a plurality of injectors disposed in accordance with an adhesive coating pattern. That is, each injector is disposed at a position corresponding to a formation position of each adhesion part 41 shown in FIG. 3. Nozzle diameters of the injectors are different from each other depending on size of the adhesion parts 41 to be formed. Further, in the case of the formation pattern 41A, an adhesive flow path leading to an injector for applying an adhesive to the core back part 22 and an adhesive flow path leading to another injector for applying an adhesive to the tooth part 23 may be separated independently from each other. In this case, chemical components of the adhesive applied to the core back part 22 and chemical components of the adhesive applied to the tooth part 23 can be separated independently from each other.

In addition, instead of a configuration in which a plurality of types of adhesives are simultaneously applied by one adhesive-coating station 130 as described above, a plurality of (for example, two) adhesive-coating stations 130 may be provided to separately apply the adhesives. In this case, a first type of adhesive is applied to one of the tooth part 23 and the core back part 22 at the first adhesive-coating station 130, and a second type of adhesive is applied to the other at the second adhesive-coating station 130.

The manufacturing device 100 further includes a stacking station 140 at a downstream position from the adhesive-coating station 130. The stacking station 140 includes a heating device 141, a fixed mold for outer shape 142, a heat insulation member 143, a movable mold for outer shape 144, and a spring 145. The heating device 141, the fixed mold for outer shape 142, and the heat insulation member 143 are disposed below the electrical steel sheet P. On the other hand, the movable mold for outer shape 144 and the spring 145 are disposed above the electrical steel sheet P. Also, reference numeral 21 indicates the stator core.

In the manufacturing device 100 of FIG. 4 having the configuration described above, first, the electrical steel sheet P is sequentially sent out from the coil C in the direction of arrow F. Then, the electrical steel sheet P is punched by the punching station 110. Subsequently, the electrical steel sheet P is punched by the punching station 120. By these punching processes, the shape of the electrical steel sheet 40 having the core back part 22 and the plurality of tooth parts 23 shown in FIG. 3 is obtained on the electrical steel sheet P. However, since it is not completely punched at this point, the process proceeds to the next step in the direction of arrow F. In the adhesive-coating station 130 in the next step, the adhesive supplied from each of the injectors of the coater 131 is applied in a point shape. At that time, amounts or types of the adhesives applied are different between the core back part 22 and the tooth part 23.

Then, finally, the electrical steel sheet P is sent out to the stacking station 140, punched out by the movable mold for outer shape 144, and laminated with high accuracy. At the time of this stacking, the electrical steel sheet 40 receives a constant pressing force by the spring 145.

By sequentially repeating the punching process, the adhesive-coating process, and the stacking process as described above, a predetermined number of electrical steel sheets 40 can be laminated. Further, the laminated core formed by stacking the electrical steel sheets 40 in this way is heated to, for example, a temperature of 200° C. by the heating device 141 in the case of thermosetting type adhesion. This heating cures the adhesives to form the adhesion parts 41. In the case of a room temperature curing type adhesive, the adhesive is cured over time to form the adhesion parts 41.

The stator core 21 is completed through each of the above steps.

Using the manufacturing device 100 described above, the stator cores 21 shown in No. 1 to No. 13 in Tables 1A and 1B were manufactured. In addition, for the production of a comparative example, the stator core 21 shown in No. 14 was also manufactured using another device.

First, a thickness of the hoop (coil C) was commonly set to 0.25 mm. An insulation coating liquid containing a metal phosphate and an acrylic resin emulsion was applied to the hoop and baked at 300° C. to form an insulation coating of 0.8 μm on one surface thereof.

Subsequently, the hoop was formed by punching into a single sheet core (electrical steel sheet 40), which has a ring shape with an outer diameter of 300 mm and an inner diameter of 240 mm and is provided with 18 rectangular tooth parts having a length of 30 mm and a width of 15 mm on an inner diameter side thereof, using the manufacturing device 100.

Subsequently, while sequentially feeding the punched single sheet core, the adhesive was applied in a point shape at each position shown in FIG. 3 (excluding the comparative example No. 14).

The chemical components of the electrical steel sheet 40 used in manufacturing each stator core 21 are unified as follows. In addition, each component value indicates mass %.

Si: 3.1%

Al: 0.7%

Mn: 0.3%

Remainder: Fe and impurities

TABLE 1A

| | | Adhesive used for forming adhesion part | | | Area ratio | |
|---|---|---|---|---|---|---|
| No. | Part | Name of adhesive | Adhesion strength (MPa) | Ratio of adhesion strength (—) | Area ratio (%) | Ratio of area ratio (—) |
| 1 | Tooth part | Chloroprene rubber-based | 2.0 | 0.40 | 60 | 1.00 |
| | Core back part | Cyanoacrylate A | 5.0 | | 60 | |
| 2 | Tooth part | Cyanoacrylate A | 5.0 | 0.33 | 60 | 1.00 |
| | Core back part | Anaerobic | 15.0 | | 60 | |
| 3 | Tooth part | Anaerobic | 15.0 | 0.63 | 60 | 1.00 |
| | Core back part | Cyanoacrylate B | 24.0 | | 60 | |
| 4 | Tooth part | Cyanoacrylate A | 5.0 | 0.10 | 60 | 1.00 |
| | Core back part | SGA | 48.0 | | 60 | |
| 5 | Tooth part | Cyanoacrylate B | 24.0 | 0.50 | 60 | 1.00 |
| | Core back part | SGA | 48.0 | | 60 | |
| 6 | Tooth part | Cyanoacrylate B | 24.0 | 0.75 | 60 | 1.00 |
| | Core back part | Epoxy A | 32.0 | | 60 | |
| 7 | Tooth part | Cyanoacrylate B | 24.0 | 0.57 | 60 | 1.00 |
| | Core back part | Epoxy B | 42.0 | | 60 | |
| 8 | Tooth part | Epoxy B | 42.0 | 0.88 | 60 | 1.00 |
| | Core back part | SGA | 48.0 | | 60 | |
| 9 | Tooth part | Cyanoacrylate B | 24.0 | 4.80 | 60 | 1.00 |
| | Core back part | Cyanoacrylate A | 5.0 | | 60 | |

TABLE 1A-continued

| | | Adhesive used for forming adhesion part | | | Area ratio | |
|---|---|---|---|---|---|---|
| No. | Part | Name of adhesive | Adhesion strength (MPa) | Ratio of adhesion strength (—) | Area ratio (%) | Ratio of area ratio (—) |
| 10 | Tooth part | Epoxy B | 42.0 | 1.31 | 60 | 1.00 |
| | Core back part | Epoxy A | 32.0 | | 60 | |
| 11 | Tooth part | Epoxy B | 42.0 | 1.75 | 60 | 1.00 |
| | Core back part | Cyanoacrylate B | 24.0 | | 60 | |
| 12 | Tooth part | SGA | 48.0 | 1.50 | 60 | 1.00 |
| | Core back part | Epoxy A | 32.0 | | 60 | |
| 13 | Tooth part | Chloroprene rubber-based | 2.0 | 0.06 | 60 | 1.00 |
| | Core back part | Epoxy A | 32.0 | | 60 | |
| 14 | Tooth part | (Fixed by fastening) | | — | — | |
| | Core back part | (Fixed by fastening) | | | — | |

TABLE 1B

| | Total adhesion strength | | Rigidity of laminated core | | Magnetic properties of tooth part | | |
|---|---|---|---|---|---|---|---|
| No. | Partial adhesion strength (MPa) | Ratio of adhesion strength (—) | Hammering test | Decision | Iron loss increase rate (%) | Decision | Example/ Comparative example |
| 1 | 1.2<br>3.0 | 0.40 | 2 | Good | 105 | Excellent | Example |
| 2 | 3.0<br>9.0 | 0.33 | 2 | Good | 103 | Excellent | Example |
| 3 | 9.0<br>14.4 | 0.63 | 2 | Good | 106 | Good | Example |
| 4 | 3.0<br>28.8 | 0.10 | 1 | Excellent | 110 | Good | Example |
| 5 | 14.4<br>28.8 | 0.50 | 1 | Excellent | 104 | Excellent | Example |
| 6 | 14.4<br>19.2 | 0.75 | 2 | Good | 105 | Excellent | Example |
| 7 | 14.4<br>25.2 | 0.57 | 1 | Excellent | 104 | Excellent | Example |
| 8 | 25.2<br>28.8 | 0.88 | 1 | Excellent | 109 | Good | Example |
| 9 | 14.4<br>3.0 | 4.80 | 5 | Poor | 126 | Poor | Comparative example |
| 10 | 25.2<br>19.2 | 1.31 | 3 | Pass | 128 | Poor | Comparative example |
| 11 | 25.2<br>14.4 | 1.75 | 3 | Pass | 131 | Poor | Comparative example |
| 12 | 28.8<br>19.2 | 1.50 | 3 | Pass | 127 | Poor | Comparative example |
| 13 | 1.2<br>19.2 | 0.06 | 3 | Pass | 112 | Pass | Example |
| 14 | 0.3<br>0.5 | 0.60 | 5 | Poor | 125 | Poor | Comparative example |

On the other hand, the adhesive for forming each adhesion part 41 was selected from the following and used in appropriate combination. Specific combinations are as shown in Table 1A.

Chloroprene rubber-based adhesive (adhesion strength: 2 MPa)
Cyanoacrylate A adhesive (adhesion strength: 5 MPa)
Anaerobic adhesive (adhesion strength: 15 MPa)
Cyanoacrylate B adhesive (adhesion strength: 24 MPa)
Epoxy A adhesive (adhesion strength: 32 MPa)
Epoxy B adhesive (adhesion strength: 42 MPa)
Epoxy C adhesive (adhesion strength: 64 MPa)
SGA (adhesion strength: 48 MPa)

Also, in the examples in Table 1A and Table 1B, the area ratio of the adhesion part 41 in the tooth part 23 is equal to the area ratio of the adhesion part 41 in the core back part 22 in all cases. For that reason, as shown in Table 1A, the adhesion strength ratio obtained by dividing the partial adhesion strength of the tooth part 23 by the partial adhesion strength of the core back part 22 is equal to an adhesion strength ratio (the comparative example No. 14 is excluded in the above). The partial adhesion strength indicates an adhesion strength (adhesion strength) of the tooth part 23 as a single part or the core back part 22 as a single part.

The electrical steel sheets 40 are stacked after applying the adhesives; and thereafter, each adhesion part 41 was formed by heating and curing while pressurizing at a predetermined pressure. The same work was repeated for 130 single sheet cores to manufacture the laminated core (stator core 21).

On the other hand, in the stator core 21 of No. 14, no adhesive was used for adhesion between the electrical steel sheets 40, and the electrical steel sheets 40 were mechanically fixed by fastening parts. These fastening parts were formed on both the core back part 22 and the tooth parts 23. In addition, sizes of the fastening parts in the tooth parts 23 are made smaller than sizes of the fastening part in the core back part 22. As a result, partial bonding strength that is average bonding strength per unit area in the tooth parts 23 was adjusted to be lower than partial bonding strength that is average bonding strength per unit area in the core back parts 22.

Rigidity (mechanical strength) of the laminated core was evaluated for each of the laminated cores of Nos. 1 to 14 manufactured using the method described above. The evaluation of the mechanical strength was decided through a hammering test. In a column of "rigidity of laminated core" in Table 1B, "excellent" indicates that high mechanical strength is secured, "good" indicates that necessary and sufficient mechanical strength is secured, and "poor" indicates that the minimum required mechanical strength is not secured. Here, "excellent" is "1", "good" is "2", "pass" is "3", and "poor" is "4" or "5".

<Hammering Test (Noise Evaluation)>

An outer circumferential end part of the core back part 22 of the laminated core was vibrated in the radial direction by an impact hammer, and a modal analysis of vibration was performed with tip of the tooth part 23 and a central part of the core back part 22 in the direction of 180° around the axis with respect to a vibration source as measurement points. Further, for a case in which the central part of the core back part 22 in the radial direction was vibrated in the axial direction by an impact hammer, a modal analysis of vibration was also performed with the tip of the tooth part 23 and the core back part 22 in the direction of 180° around the axis with respect to the vibration source as the measurement points.

Evaluation (decision) was performed in accordance with the following criteria. The smaller the value is, it indicates that vibration is inhibited and the mechanical strength is higher.

1 (excellent): Only one or two vibration peaks are detected.

2 (good): Several vibration peaks are detected.

3 (pass): 10 or more vibration peaks are detected depending on a vibration direction.

4 (poor): There is a main peak, but 10 or more vibration peaks are detected.

5 (poor): There is no main peak, and 10 or more vibration peaks are detected.

Further, the magnetic properties of the laminated core were also evaluated. The magnetic properties were evaluated by measuring the iron loss using a rotational iron loss simulator (not shown) having a rotor-shaped detector having a diameter of 239.5 mm. In a column of "magnetic properties of tooth part" in Table 1B, "excellent" indicates that extremely high magnetic properties can be secured. Further, "good" indicates that high magnetic properties are ensured. "Pass" indicates that necessary and sufficient magnetic properties are secured. Further, "poor" indicates that magnetic properties are lower than the minimum required magnetic properties.

Here, first, a value of iron loss measured at a magnetic flux density of 1.5 Tesla with respect to the electrical steel sheet 40 before adhesion was obtained as a reference value. Subsequently, the iron loss was measured similarly for each of the laminated cores at a magnetic flux density of 1.5 Tesla. Then, the iron loss of each laminated core was divided by the reference value and was shown by 100%-indication to obtain an increase rate. For example, in No. 1 in Table 1B, an iron loss increase rate is 105%, and this indicates that the iron loss increased by 5% with respect to the reference value.

A case in which the iron loss increase rate obtained in this way is 5% or less (the numerical value in the table is 105% or less) was defined as "excellent", a case in which it is more than 5% and is 10% or less (the numerical value in the table is more than 105% and 110% or less) was defined as "good", a case in which it is more than 10% and 20% or less (the numerical value in the table is more than 110% and less than 120%) was defined as "pass", and a case in which it is more than 120% (the numerical value in the table exceeds 120%) was defined as "poor".

As shown in Table 1A and Table 1B, in the comparative example shown in No.

9, the partial adhesion strength in the tooth part 23 was significantly higher than the partial strength in the core back part 22, and thus the magnetic properties of the tooth part 23 were lowered. Further, since the partial adhesion strength in the core back part 22 was too low, the rigidity of the laminated core also decreased.

Also, in the comparative examples shown in Nos. 10 to 12, since the partial adhesion strength in the tooth part 23 is higher than the partial strength in the core back part 22, the magnetic properties of the tooth part 23 were lowered.

Also, in the comparative example using the fastening part shown in No. 14, since a compressive force was applied to the tooth part 23 due to formation of the fastening part, the magnetic properties were significantly reduced.

On the other hand, in the examples of Nos. 1 to 8 and 13, it was confirmed that the laminated core had high rigidity (mechanical strength), high magnetic properties, and desired performance.

Figure 5:
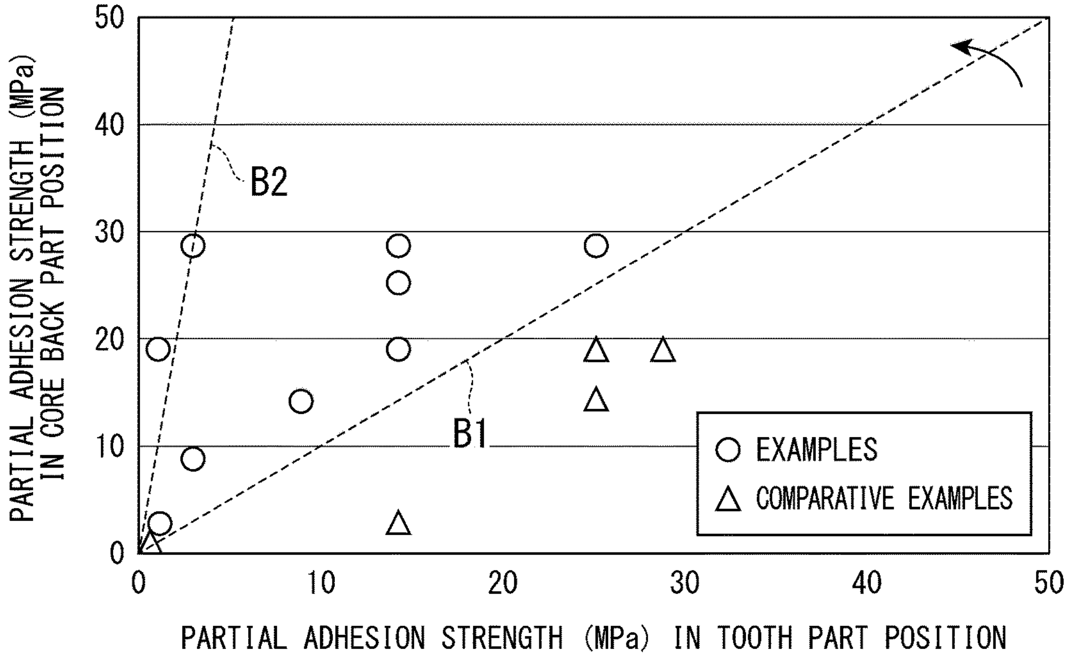
FIG. 5 is a diagram showing examples shown in Tables 1A and 1B and is a graph showing a relationship between a partial adhesion strength at a tooth part position and a partial adhesion strength at a core back part position.

Further, FIG. 5 shows a relationship between the partial adhesion strength at a tooth part position and the partial adhesion strength at a core back position shown in Table 1A. In FIG. 5, those below a boundary line B1 at which the partial adhesion strength at the tooth part position and the partial adhesion strength in the core back part position are equal, are comparative examples of Nos. 9 to 12. Although No. 14 is above the boundary line B1, the electrical steel sheets 40 are fixed with each other by fastening instead of adhering, and thus as described above, desired properties were not obtained particularly in terms of magnetic properties.

A boundary line B2 indicates a condition in which the adhesion strength ratio is 0.1. Although the example of No. 13, which deviates leftward from the boundary line B2 on the paper, was "pass" in terms of both rigidity and magnetic properties of the laminated core, the bonding strength of the tooth part 23 was low and the rigidity of the laminated core was slightly insufficient in some cases, and thus it did not reach "excellent". On the other hand, in the examples shown in Nos. 1 to 8, results of "excellent" or an equivalent thereto were obtained in terms of either rigidity or magnetic properties of the laminated core. From this result, it can be said that the adhesion strength ratio is more preferably 0.1 or more in addition to being less than 1.0.

Subsequently, using the manufacturing device 100, the stator cores 21 shown in Nos. 15 to 29 in Tables 2A and 2B were manufactured. In the present embodiment, although the adhesive used was changed in each case, the adhesive applied to the tooth part 23 and the adhesive applied to the core back part 22 were the same. For that reason, the adhesion strength ratios were all unified to 1.00.

On the other hand, regarding the area ratio, a coating amount of the adhesive coated on the tooth part 23 and a coating amount of the adhesive coated on the core back part 22 are different, and as a result, the area ratio was changed in each case.

Also, in Table 2B, each threshold of "excellent", "good", "pass", and "poor" regarding the rigidity of the laminated core is as described in Table 1B. Similarly, each threshold of "excellent", "good", "pass", and "poor" regarding the magnetic properties of the tooth part is also as described in Table 1B.

TABLE 2A

| No. | Part | Adhesive used for forming adhesion part: Name of adhesive | Adhesion strength (MPa) | Ratio of adhesion strength (—) | Area ratio: Area ratio (%) | Area ratio: Ratio of area ratio (—) |
|---|---|---|---|---|---|---|
| 15 | Tooth part | Cyanoacrylate B | 24.0 | 1.00 | 20 | 0.33 |
| | Core back part | Cyanoacrylate B | 24.0 | | 60 | |
| 16 | Tooth part | Cyanoacrylate B | 24.0 | 1.00 | 40 | 0.73 |
| | Core back part | Cyanoacrylate B | 24.0 | | 55 | |
| 17 | Tooth part | Epoxy B | 42.0 | 1.00 | 10 | 0.18 |
| | Core back part | Epoxy B | 42.0 | | 55 | |
| 18 | Tooth part | Epoxy B | 42.0 | 1.00 | 45 | 0.64 |
| | Core back part | Epoxy B | 42.0 | | 70 | |
| 19 | Tooth part | SGA | 48.0 | 1.00 | 15 | 0.17 |
| | Core back part | SGA | 48.0 | | 90 | |
| 20 | Tooth part | SGA | 48.0 | 1.00 | 30 | 0.40 |
| | Core back part | SGA | 48.0 | | 75 | |
| 21 | Tooth part | Cyanoacrylate B | 24.0 | 1.00 | 5 | 0.05 |
| | Core back part | Cyanoacrylate B | 24.0 | | 95 | |
| 22 | Tooth part | Cyanoacrylate B | 24.0 | 1.00 | 5 | 0.13 |
| | Core back part | Cyanoacrylate B | 24.0 | | 40 | |
| 23 | Tooth part | Cyanoacrylate B | 24.0 | 1.00 | 80 | 1.07 |
| | Core back part | Cyanoacrylate B | 24.0 | | 75 | |
| 24 | Tooth part | Epoxy C | 32.0 | 1.00 | 75 | 1.25 |
| | Core back part | Cyanoacrylate B | 24.0 | | 60 | |
| 25 | Tooth part | Cyanoacrylate B | 24.0 | 1.00 | 70 | 2.00 |
| | Core back part | Cyanoacrylate B | 24.0 | | 35 | |
| 26 | Tooth part | Epoxy B | 42.0 | 1.00 | 3 | 0.04 |
| | Core back part | Epoxy B | 42.0 | | 80 | |
| 27 | Tooth part | Epoxy B | 42.0 | 1.00 | 30 | 0.60 |
| | Core back part | Epoxy B | 42.0 | | 50 | |
| 28 | Tooth part | Epoxy C | 64.0 | 1.00 | 55 | 0.69 |
| | Core back part | Epoxy C | 64.0 | | 80 | |
| 29 | Tooth part | Epoxy C | 64.0 | 1.00 | 10 | 0.11 |
| | Core back part | Epoxy C | 64.0 | | 90 | |

TABLE 2B

| No. | Total adhesion strength: Partial adhesion strength (MPa) | Total adhesion strength: Ratio of adhesion strength (—) | Rigidity of laminated core: Hammering test | Rigidity of laminated core: Decision | Magnetic properties of tooth part: Iron loss increase rate (%) | Magnetic properties of tooth part: Decision | Example/Comparative example |
|---|---|---|---|---|---|---|---|
| 15 | 4.8<br>14.4 | 0.33 | 2 | Good | 105 | Excellent | Example |
| 16 | 9.6<br>13.2 | 0.73 | 2 | Good | 106 | Good | Example |
| 17 | 4.2<br>23.1 | 0.18 | 1 | Excellent | 103 | Excellent | Example |
| 18 | 8.4<br>29.4 | 0.29 | 1 | Excellent | 109 | Good | Example |
| 19 | 7.2<br>43.2 | 0.17 | 1 | Excellent | 104 | Excellent | Example |
| 20 | 14.4<br>36.0 | 0.40 | 1 | Excellent | 108 | Good | Example |
| 21 | 1.2<br>22.8 | 0.05 | 3 | Pass | 110 | Good | Example |

TABLE 2B-continued

| No. | Total adhesion strength: Partial adhesion strength (MPa) | Total adhesion strength: Ratio of adhesion strength (—) | Rigidity of laminated core: Hammering test | Rigidity of laminated core: Decision | Magnetic properties of tooth part: Iron loss increase rate (%) | Magnetic properties of tooth part: Decision | Example/ Comparative example |
|---|---|---|---|---|---|---|---|
| 22 | 1.2<br>9.6 | 0.13 | 3 | Pass | 110 | Good | Example |
| 23 | 19.2<br>18.0 | 1.07 | 3 | Pass | 123 | Poor | Comparative example |
| 24 | 24.0<br>14.4 | 1.67 | 3 | Pass | 121 | Poor | Comparative example |
| 25 | 16.8<br>8.4 | 2.00 | 3 | Pass | 131 | Poor | Comparative example |
| 26 | 1.3<br>33.6 | 0.04 | 3 | Pass | 112 | Pass | Example |
| 27 | 12.6<br>21.0 | 0.60 | 1 | Excellent | 106 | Good | Example |
| 28 | 35.2<br>51.2 | 0.69 | 1 | Excellent | 114 | Pass | Example |
| 29 | 6.4<br>57.6 | 0.11 | 1 | Excellent | 110 | Good | Example |

Figure 6:
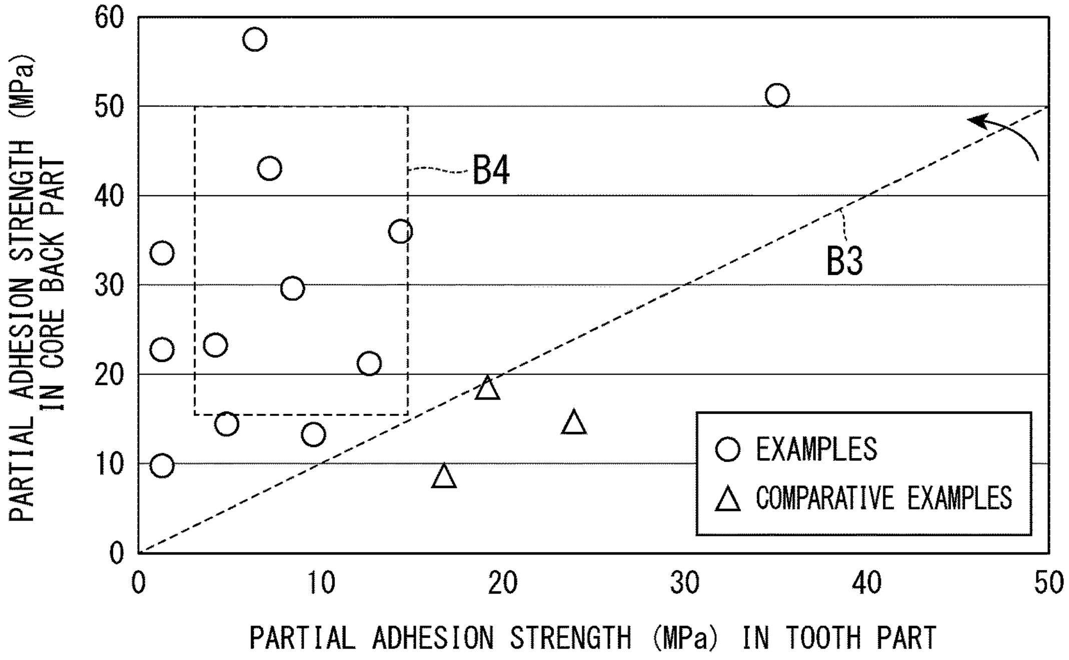
FIG. 6 is a diagram showing examples shown in Tables 2A and 2B and is a graph showing a relationship between a partial adhesion strength at a tooth part position and a partial adhesion strength at a core back part position.

In the comparative examples of Nos. 23 to 25 shown in Tables 2A and 2B, the partial adhesion strength in the tooth part 23 was higher than the partial strength in the core back part 22, and thus the magnetic properties of the tooth part 23 were deteriorated. Further, FIG. 6 shows a relationship between the partial adhesion strength at the tooth part position and the partial adhesion strength in the core back part position shown in Table 2A. In FIG. 6, those below a boundary line B3 at which the partial adhesion strength at the tooth part position and the partial adhesion strength in the core back part position are equal, are the comparative examples of Nos. 23 to 25.

On the other hand, as shown in Table 2B, it was confirmed that, in the examples of Nos. 15 to 22 and 26 to 29, the laminated cores had high rigidity (mechanical strength), high magnetic properties, and desired performance.

In addition, the examples of Nos. 17 to 20 and 27 surrounded by a boundary line B4 forming a square frame were "excellent" in both the rigidity and the magnetic properties of the laminated core. From this result, it was found that it is more preferable that: the average value S1 of the partial adhesion strength in the tooth part 23 be 3 to 15 MPa; the average value S2 of the partial adhesion strength in the core back part 22 be 15 to 50 MPa; and the average value S1 be lower than the average value S2.

Subsequently, using the manufacturing device 100, the stator cores 21 shown in Nos. 30 to 47 in Tables 3A and 3B were manufactured.

Also, in Table 3B, each threshold of "excellent", "good", "pass", and "poor" regarding the rigidity of the laminated core is as described in Table 1B. Similarly, each threshold of "excellent", "good", "pass", and "poor" regarding the magnetic properties of the tooth part is also as described in Table 1B.

In No. 30 to No. 46, although the adhesive used was changed in each case, the adhesive applied to the tooth part 23 and the adhesive applied to the core back part 22 were the same (the adhesive having the same chemical components). For that reason, the adhesion strength ratios are all unified to 1.00. Further, regarding the area ratio, the coating amount of the adhesive coated on the tooth part 23 and the coating amount of the adhesive coated on the core back part 22 were differentiated, and as a result, the area ratio was changed in each case.

On the other hand, in No. 47, the adhesive coated on the tooth part 23 and the adhesive coated on the core back part 22 were different. Moreover, in No. 47, a combination of both adhesives was selected such that the adhesion strength of the adhesive in the tooth part 23 was lower than the adhesion strength of the adhesive in the core back part 22. Also, as for the area ratio, the coating amount of the adhesive coated on the tooth part 23 was smaller than the coating amount of the adhesive coated on the core back part 22. As a result, the area ratio in the tooth part 23 was smaller than the area ratio in the core back part 22.

TABLE 3A

| No. | Part | Adhesive used for forming adhesion part: Name of adhesive | Adhesion strength (MPa) | Ratio of adhesion strength (—) | Area ratio: Area ratio (%) | Area ratio: Ratio of area ratio (—) |
|---|---|---|---|---|---|---|
| 30 | Tooth part | Epoxy C | 64.0 | 1.00 | 30 | 0.43 |
| | Core back part | Epoxy C | 64.0 | | 70 | |
| 31 | Tooth part | Epoxy A | 32.0 | 1.00 | 40 | 0.44 |
| | Core back part | Epoxy A | 32.0 | | 90 | |
| 32 | Tooth part | Epoxy C | 64.0 | 1.00 | 35 | 0.58 |
| | Core back part | Epoxy C | 64.0 | | 60 | |

TABLE 3A-continued

| No. | Part | Adhesive used for forming adhesion part: Name of adhesive | Adhesion strength (MPa) | Ratio of adhesion strength (—) | Area ratio: Area ratio (%) | Area ratio: Ratio of area ratio (—) |
|---|---|---|---|---|---|---|
| 33 | Tooth part | SGA | 48.0 | 1.00 | 40 | 0.73 |
| | Core back part | SGA | 48.0 | | 55 | |
| 34 | Tooth part | Cyanoacrylate B | 24.0 | 1.00 | 15 | 0.23 |
| | Core back part | Cyanoacrylate B | 24.0 | | 65 | |
| 35 | Tooth part | Epoxy B | 42.0 | 1.00 | 20 | 0.29 |
| | Core back part | Epoxy B | 42.0 | | 70 | |
| 36 | Tooth part | SGA | 48.0 | 1.00 | 15 | 0.17 |
| | Core back part | SGA | 48.0 | | 90 | |
| 37 | Tooth part | SGA | 48.0 | 1.00 | 15 | 0.20 |
| | Core back part | SGA | 48.0 | | 75 | |
| 38 | Tooth part | Cyanoacrylate B | 24.0 | 1.00 | 5 | 0.05 |
| | Core back part | Cyanoacrylate B | 24.0 | | 95 | |
| 39 | Tooth part | Cyanoacrylate B | 24.0 | 1.00 | 5 | 0.13 |
| | Core back part | Cyanoacrylate B | 24.0 | | 40 | |
| 40 | Tooth part | Cyanoacrylate B | 24.0 | 1.00 | 80 | 1.07 |
| | Core back part | Cyanoacrylate B | 24.0 | | 75 | |
| 41 | Tooth part | Anaerobic | 15.0 | 1.00 | 80 | 1.33 |
| | Core back part | Anaerobic | 15.0 | | 60 | |
| 42 | Tooth part | Cyanoacrylate B | 24.0 | 1.00 | 70 | 2.00 |
| | Core back part | Cyanoacrylate B | 24.0 | | 35 | |
| 43 | Tooth part | Epoxy B | 42.0 | 1.00 | 3 | 0.04 |
| | Core back part | Epoxy B | 42.0 | | 80 | |
| 44 | Tooth part | Epoxy B | 42.0 | 1.00 | 3 | 0.09 |
| | Core back part | Epoxy B | 42.0 | | 35 | |
| 45 | Tooth part | Epoxy C | 64.0 | 1.00 | 55 | 0.69 |
| | Core back part | Epoxy C | 64.0 | | 80 | |
| 46 | Tooth part | Epoxy C | 64.0 | 1.00 | 8 | 0.09 |
| | Core back part | Epoxy C | 64.0 | | 90 | |
| 47 | Tooth part | Anaerobic | 15.0 | 0.36 | 20 | 0.57 |
| | Core back part | Epoxy C | 42.0 | | 45 | |

TABLE 3B

| No. | Total adhesion strength: Partial adhesion strength (MPa) | Total adhesion strength: Ratio of adhesion strength (—) | Rigidity of laminated core: Hammering test | Rigidity of laminated core: Decision | Magnetic properties of tooth part: Iron loss increase rate (%) | Magnetic properties of tooth part: Decision | Example/ Comparative example |
|---|---|---|---|---|---|---|---|
| 30 | 19.2<br>44.8 | 0.43 | 1 | Excellent | 105 | Excellent | Example |
| 31 | 12.8<br>28.8 | 0.44 | 1 | Excellent | 105 | Excellent | Example |
| 32 | 22.4<br>38.4 | 0.58 | 1 | Excellent | 107 | Good | Example |
| 33 | 19.2<br>26.4 | 0.73 | 1 | Excellent | 108 | Good | Example |
| 34 | 3.6<br>15.6 | 0.23 | 1 | Excellent | 109 | Good | Example |
| 35 | 8.4<br>29.4 | 0.29 | 1 | Excellent | 103 | Excellent | Example |
| 36 | 7.2<br>43.2 | 0.17 | 1 | Excellent | 107 | Good | Example |
| 37 | 7.2<br>36.0 | 0.20 | 1 | Excellent | 106 | Good | Example |
| 38 | 1.2<br>22.8 | 0.05 | 2 | Good | 110 | Good | Example |
| 39 | 1.2<br>9.6 | 0.13 | 2 | Good | 105 | Excellent | Example |
| 40 | 19.2<br>18.0 | 1.07 | 2 | Good | 127 | Poor | Comparative example |
| 41 | 12.0<br>9.0 | 1.33 | 3 | Pass | 128 | Poor | Comparative example |
| 42 | 16.8<br>8.4 | 2.00 | 3 | Pass | 131 | Poor | Comparative example |

TABLE 3B-continued

| | Total adhesion strength | | Rigidity of laminated core | | Magnetic properties of tooth part | | |
|---|---|---|---|---|---|---|---|
| No. | Partial adhesion strength (MPa) | Ratio of adhesion strength (—) | Hammering test | Decision | Iron loss increase rate (%) | Decision | Example/ Comparative example |
| 43 | 1.3<br>33.6 | 0.04 | 3 | Pass | 111 | Pass | Example |
| 44 | 1.3<br>14.7 | 0.09 | 3 | Pass | 115 | Pass | Example |
| 45 | 35.2<br>51.2 | 0.69 | 1 | Excellent | 113 | Pass | Example |
| 46 | 5.1<br>57.6 | 0.09 | 1 | Excellent | 112 | Pass | Example |
| 47 | 3.0<br>18.9 | 0.16 | 3 | Pass | 103 | Excellent | Example |

As a result, in the comparative examples of Nos. 40 to 42 shown in Tables 3A and 3B, the partial adhesion strength in the tooth part 23 was higher than the partial strength in the core back part 22, and thus the magnetic properties of the tooth part 23 decreased.

On the other hand, as shown in Tables 3A and 3B, it was confirmed that, in the examples of Nos. 30 to 39 and 43 to 47, the laminated cores had high rigidity (mechanical strength), high magnetic properties, and desired performance.

Figure 7:
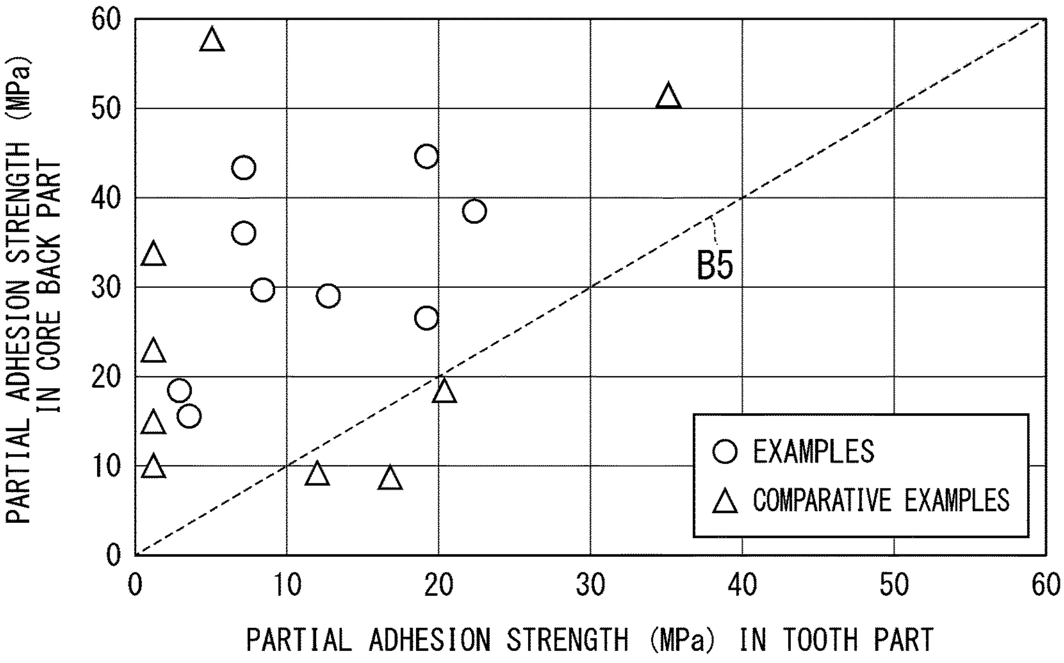
FIG. 7 is a diagram showing examples shown in Tables 3A and 3B and is a graph showing a relationship between a partial adhesion strength at a tooth part position and a partial adhesion strength at a core back part position.

Further, FIG. 7 shows a relationship between the partial adhesion strength at the tooth part position and the partial adhesion strength in the core back part position shown in Table 3A. In FIG. 7, those below a boundary line B5 at which the partial adhesion strength at the tooth part position and the partial adhesion strength in the core back part position are equal are the comparative examples of Nos. 40 to 42.

Figure 8:
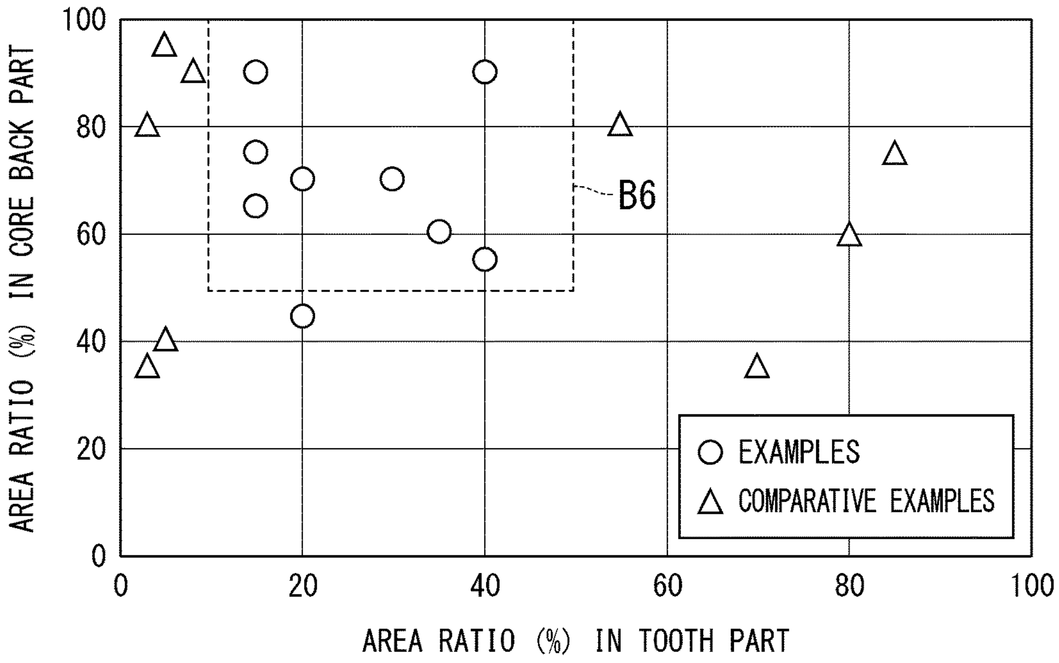
FIG. 8 is a diagram showing the examples shown in Tables 3A and 3B and is a graph showing a relationship between an area ratio at the tooth part position and an area ratio in the core back part position.

Further, FIG. 8 shows a relationship between the area ratio at the tooth part position and the area ratio in the core back part position shown in Table 3A.

The examples of Nos. 30 to 37 surrounded by a boundary line B6 forming a square frame in FIG. 8 obtained "excellent" or an equivalent result thereto in terms of both the rigidity and the magnetic properties of the laminated core. From this result, it was found that it is more preferable that: the average value A1 of the area ratio of each of the adhesion parts in the tooth part 23 be 10 to 50%; the average value A2 of the area ratio of each of the adhesion parts in the core back part 22 be 50 to 100%; and the average value A1 be lower than the average value A2.

The embodiment and examples of the present invention have been described above. However, the technical scope of the present invention is not limited only to the above-described embodiment and the examples, and various modifications can be added without departing from the spirit of the present invention.

For example, the shape of the stator core 21 is not limited only to the form shown in the above embodiment. Specifically, dimensions of the outer diameter and the inner diameter of the stator core 21, the laminated thickness, the number of slots, a dimensional ratio of the tooth part 23 between in the circumferential direction and in the radial direction, a dimensional ratio in the radial direction between the tooth part 23 and the core back part 22, and the like can be arbitrarily designed in accordance with desired properties of the electric motor.

In the rotor 30 of the above embodiment, the set of two permanent magnets 32 form one magnetic pole, but the present invention is not limited thereto. For example, one permanent magnet 32 may form one magnetic pole, or three or more permanent magnets 32 may form one magnetic pole.

In the above-described embodiment, the permanent magnetic electric motor has been described as an example of the electric motor 10, but as illustrated below, the structure of the electric motor 10 is not limited thereto, and various known structures not illustrated below can also be adopted.

In the above-described embodiment, the permanent magnetic electric motor has been described as an example of the electric motor 10, but the present invention is not limited thereto. For example, the electric motor 10 may be a reluctance motor or an electromagnet field motor (a wound-field motor).

In the above-described embodiment, the synchronous motor has been described as an example of the AC motor, but the present invention is not limited thereto. For example, the electric motor 10 may be an induction motor.

In the above-described embodiment, the AC motor has been described as an example of the electric motor 10, but the present invention is not limited thereto. For example, the electric motor 10 may be a DC motor.

In the above-described embodiment, the motor has been described as an example of the electric motor 10, but the present invention is not limited thereto. For example, the electric motor 10 may be a generator.

In addition, within the range not departing from the scope of the present invention, it is possible to replace the components in the embodiment with well-known components as appropriate, and the above-mentioned modified examples may be combined with each other as appropriate.

INDUSTRIAL APPLICABILITY

According to the present invention, an adhesively-laminated core for a stator including an adhesion structure that does not adversely affect magnetic properties while increasing mechanical strength thereof, and an electric motor including the adhesively-laminated core for a stator can be provided. Therefore, it provides great industrial applicability.

BRIEF DESCRIPTION OF THE REFERENCE SYMBOLS

10 Electric motor
21 Adhesively-laminated core for stator

22 Core back part

23 Tooth part

40 Electrical steel sheet

41 Adhesion part

What is claimed is:

1. An adhesively-laminated core for a stator comprising:

a plurality of electrical steel sheets coaxially overlapping each other, and each of which having a core back part and a tooth part; and a plurality of adhesion parts which adheres between the electrical steel sheets respectively in the core back parts and the tooth parts, wherein, between the respective electrical steel sheets, a partial adhesion strength provided by the adhesion parts and being an average adhesion strength per unit area in the tooth part, is lower than a partial adhesion strength provided by the adhesion parts and being an average adhesion strength per unit area in the core back part, wherein the adhesion parts are applied in the same locations on each electrical steel sheet in the stack, including on each tooth portion and on the core back part aligned with each tooth portion, wherein each of the adhesion parts in the core back part has a point shape, and the plurality of point-shaped adhesion parts are arranged in an annular shape in the core back part, and wherein each adhesion part in the core back part aligns with a virtual straight line EL connecting a central portion of each adjacent tooth part and a central axis O of the electrical steel sheet.

2. The adhesively-laminated core for a stator according to claim 1, wherein an average value of an adhesion strength ratio obtained by dividing the partial adhesion strength in the tooth part by the partial adhesion strength in the core back part is in the range of 0.1 or more and less than 1.0.

3. The adhesively-laminated core for a stator according to claim 1, wherein: an average value S1 of the partial adhesion strength in the tooth part is 1 to 15 MPa;

an average value S2 of the partial adhesion strength in the core back part is 15 to 50 MPa; and the average value S1 is lower than the average value S2.

4. The adhesively-laminated core for a stator according to claim 1, wherein: each of the adhesion parts is made of an adhesive having the same chemical composition;

an average value A1 of an area ratio of the adhesion parts in the tooth part is 10 to 50%;

an average value A2 of the area ratio of the adhesion parts in the core back part is 50 to 100%; and the average value A1 is lower than the average value A2.

5. The adhesively-laminated core for a stator according to claim 1, wherein an average thickness of the adhesion parts is 1.0 μm to 3.0 μm.

6. The adhesively-laminated core for a stator according to claim 1, wherein an average tensile modulus of elasticity E of the adhesion parts is 1500 MPa to 4500 MPa.

7. The adhesively-laminated core for a stator according to claim 1, wherein the adhesion parts are a room temperature adhesion type acrylic-based adhesive containing an SGA made of an elastomer-containing acrylic-based adhesive.

8. An electric motor comprising the adhesively-laminated core for a stator according to claim 1.

9. An adhesively-laminated core for a stator comprising:

a plurality of electrical steel sheets coaxially overlapping each other, and each of which having a core back part and a tooth part; and a plurality of adhesion parts which adheres between the electrical steel sheets respectively in the core back parts and the tooth parts, wherein, between the respective electrical steel sheets, a partial adhesion strength provided by the adhesion parts and being an average adhesion strength per unit area in the tooth part, is lower than a partial adhesion strength provided by the adhesion parts and being an average adhesion strength per unit area in the core back part, wherein the adhesion parts are applied such that both the adhesion part in the tooth portion and the adhesion part in the core back part are aligned with a virtual straight line EL connecting a central portion of each tooth part in the width direction and a central axis O of the electrical steel sheet, wherein each of the adhesion parts in the core back part has a point shape, and the plurality of point-shaped adhesion parts are arranged in an annular shape in the core back part, and wherein each adhesion part in the core back part aligns with the adhesion parts in each adjacent tooth portion and aligns with the virtual straight line EL.

* * * * *